(12) United States Patent
Russo et al.

(10) Patent No.: US 12,646,330 B2
(45) Date of Patent: Jun. 2, 2026

(54) METHOD AND SYSTEM FOR VEHICLE IDENTIFICATION

(71) Applicant: VIGILANT SOLUTIONS, LLC, Livermore, CA (US)

(72) Inventors: Pietro Russo, Melrose, MA (US); William Fincannon, Allen, TX (US); Phong Quang Dinh, Ho Chi Minh (VN)

(73) Assignee: VIGILANT SOLUTIONS, LLC, Livermore, CA (US)

( * ) Notice: Subject to any disclaimer, the term of this patent is extended or adjusted under 35 U.S.C. 154(b) by 255 days.

(21) Appl. No.: 18/656,901

(22) Filed: May 7, 2024

(65) Prior Publication Data

US 2025/0349125 A1 Nov. 13, 2025

(51) Int. Cl.
*G06V 20/54* (2022.01)
*G06V 10/56* (2022.01)
(Continued)

(52) U.S. Cl.
CPC .............. *G06V 20/54* (2022.01); *G06V 10/56* (2022.01); *G06V 10/764* (2022.01);
(Continued)

(58) Field of Classification Search
CPC .... G06V 20/64; G06V 2201/06; G06V 10/82; G06V 20/56; G06V 10/764; G06V 10/56;
(Continued)

(56) References Cited

U.S. PATENT DOCUMENTS 9,412,268 B2    8/2016  Saptharishi et al.
9,911,055 B2 *  3/2018  Kozitsky .............. G06V 10/454
(Continued)

FOREIGN PATENT DOCUMENTS

KR    20230009598 A    1/2023
WO     2022093053 A1   5/2022

OTHER PUBLICATIONS

N. Smolyanskiy, A. Kamenev and S. Birchfield, "On the Importance of Stereo for Accurate Depth Estimation: An Efficient Semi-Supervised Deep Neural Network Approach," 2018 IEEE/CVF Conference on Computer Vision and Pattern Recognition Workshops (CVPRW), Salt Lake City, UT, USA, 2018, pp. 1120-11208, doi: 10.1109/CVPRW.2018.00147.
(Continued)

*Primary Examiner* — Courtney Joan Nelson

(57) ABSTRACT

A vehicle identification system includes at least one camera configured to capture a color image and a monochrome image, each in respect of at least a portion of a vehicle. At least one electronic storage medium stores program instructions executable by an at least one processor to cause it to perform establishing a first machine learning model to process the color image for first object classification feature(s) corresponding to the vehicle. An accuracy confidence of the first object classification with respect to at least one of the feature(s) is determined. A second machine learning model processes, when the determined accuracy confidence is less than a predefined threshold, a combination of the color image along with the monochrome image, or along with a depth image derived at least in part from the monochrome image, for second object classification of the at least one of the feature(s).

16 Claims, 6 Drawing Sheets

(51) Int. Cl.

| *G06V 10/764* | (2022.01) |
| *G06V 10/776* | (2022.01) |
| *G06V 20/62* | (2022.01) |

(52) U.S. Cl.

CPC .......... *G06V 10/776* (2022.01); *G06V 20/625* (2022.01); *G06V 2201/08* (2022.01)

(58) Field of Classification Search

CPC .. G06V 10/803; G06V 10/806; G06V 10/809; G06V 20/00; G06V 20/58; G06V 2201/07; G06V 20/588; G06V 2201/08; G06V 10/147; G06V 10/70; G06V 20/54; G06V 20/625; G06V 10/20; G06V 10/443; G06V 20/60; G06V 10/776; G06T 2207/10028; G06T 7/73; G06T 7/50; G06T 2207/20084; G06T 7/174; G06T 2207/20081; G06T 2207/10024; G06T 2207/30252; G06T 2207/10004; G06T 7/70; G06T 5/60; G06T 7/593; G06T 7/85; G06T 7/90; G06N 3/08; G06N 20/00; G06N 3/045; H04N 23/90; H04N 13/204; H04N 13/257; H04N 7/181; H04N 23/61

See application file for complete search history.

(56) References Cited

U.S. PATENT DOCUMENTS

| 10,573,012 | B1 | 2/2020 | Collins et al. | |
| 11,100,350 | B2 | 8/2021 | Piette et al. | |
| 11,301,711 | B2 * | 4/2022 | Price | G06V 20/20 |
| 11,303,877 | B2 | 4/2022 | Kedarisetti et al. | |
| 11,501,542 | B2 | 11/2022 | Dinh | |
| 2014/0139639 | A1 | 5/2014 | Wagner et al. | |
| 2015/0110358 | A1 * | 4/2015 | Han | G06V 20/63 |
| | | | | 382/105 |
| 2023/0342972 | A1 | 10/2023 | Araujo et al. | |
| 2024/0395027 | A1 * | 11/2024 | Shen | G06N 3/045 |

OTHER PUBLICATIONS

H.-G. Jeon, J.-Y. Lee, S. Im, H. Ha and I. S. Kweon, "Stereo Matching with Color and Monochrome Cameras in Low-Light Conditions," 2016 IEEE Conference on Computer Vision and Pattern Recognition (CVPR), Las Vegas, NV, USA, 2016, pp. 4086-4094, doi: 10.1109/CVPR.2016.443.

* cited by examiner

400

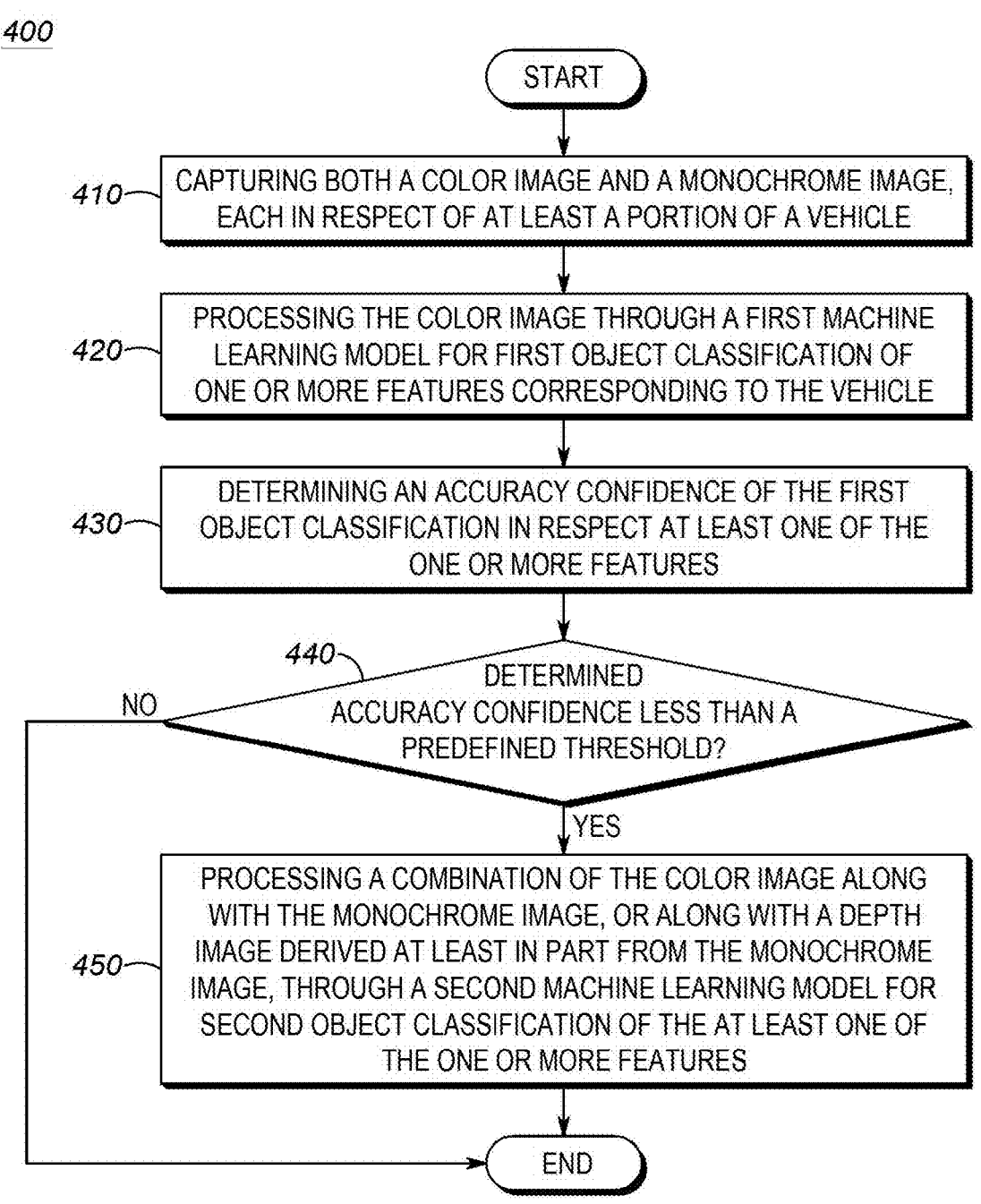

START

410 — CAPTURING BOTH A COLOR IMAGE AND A MONOCHROME IMAGE, EACH IN RESPECT OF AT LEAST A PORTION OF A VEHICLE

420 — PROCESSING THE COLOR IMAGE THROUGH A FIRST MACHINE LEARNING MODEL FOR FIRST OBJECT CLASSIFICATION OF ONE OR MORE FEATURES CORRESPONDING TO THE VEHICLE

430 — DETERMINING AN ACCURACY CONFIDENCE OF THE FIRST OBJECT CLASSIFICATION IN RESPECT AT LEAST ONE OF THE ONE OR MORE FEATURES

440 — DETERMINED ACCURACY CONFIDENCE LESS THAN A PREDEFINED THRESHOLD?

NO

YES

450 — PROCESSING A COMBINATION OF THE COLOR IMAGE ALONG WITH THE MONOCHROME IMAGE, OR ALONG WITH A DEPTH IMAGE DERIVED AT LEAST IN PART FROM THE MONOCHROME IMAGE, THROUGH A SECOND MACHINE LEARNING MODEL FOR SECOND OBJECT CLASSIFICATION OF THE AT LEAST ONE OF THE ONE OR MORE FEATURES

END

*FIG. 4*

| THRESHOLD | PRECISION | RECALL | #CORRECT IMAGE |
|:---:|:---:|:---:|:---:|
| 0.00 | 0.9131 | 0.8335 | 5492 |
| 0.05 | 0.9137 | 0.8335 | 5492 |
| 0.10 | 0.9141 | 0.8334 | 5491 |
| 0.15 | 0.9180 | 0.8320 | 5487 |
| 0.20 | 0.9195 | 0.8305 | 5475 |
| 0.25 | 0.9215 | 0.8309 | 5461 |
| 0.30 | 0.9340 | 0.8314 | 5445 |
| 0.35 | 0.9399 | 0.8290 | 5417 |
| 0.40 | 0.9443 | 0.8241 | 5376 |
| 0.45 | 0.9483 | 0.8246 | 5320 |
| 0.50 | 0.9507 | 0.8229 | 5270 |
| 0.55 | 0.9555 | 0.8149 | 5197 |
| 0.60 | 0.9595 | 0.8127 | 5126 |
| 0.65 | 0.9638 | 0.8018 | 5038 |
| 0.70 | 0.9690 | 0.7993 | 4943 |
| 0.75 | 0.9734 | 0.7859 | 4857 |
| 0.80 | 0.9809 | 0.7724 | 4745 |
| 0.85 | 0.9890 | 0.7575 | 4602 |
| 0.90 | 0.9898 | 0.7536 | 4380 |
| 0.95 | 0.9887 | 0.7205 | 4053 |
| 1.00 | 1.0000 | 0.0192 | 5 |

*FIG. 6*

METHOD AND SYSTEM FOR VEHICLE IDENTIFICATION

BACKGROUND

Automatic License Plate Recognition (ALPR) is a technology that, amongst other things, uses optical character recognition on images to read vehicle registration plates to create vehicle identification data. An ALPR system can use existing closed-circuit television, road-rule enforcement cameras, or cameras specifically designed for the task. An ALPR system can also include a server with storage to store the images captured by the cameras as well as the text from the license plate. As ALPR systems become more and more advanced over time, the expectation for them to provide more detailed and consistently reliable information is increasing.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 4 is a flow chart illustrating a method for multi-model classification in a vehicle identification system, in accordance with an example embodiment;

FIG. 6 is a table of experimental data for different thresholds of accuracy confidence for a first machine learning model of the two machine learning models shown in FIG. 5.

Figure 1:
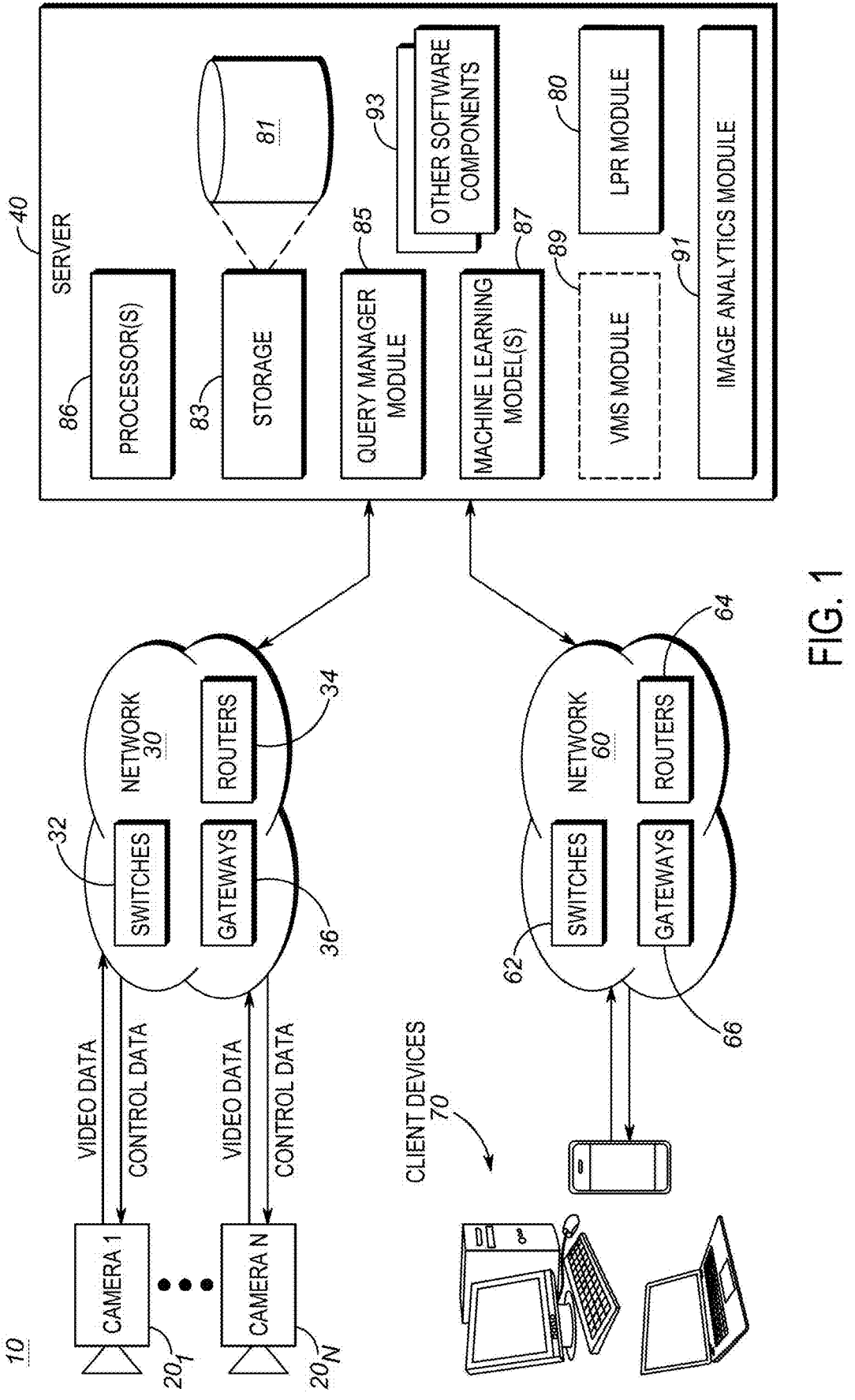
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided of computer-implemented method for multi-model classification in a vehicle identification system. The computer-implemented method includes providing both a color image and a monochrome image, each in respect of at least a portion of a vehicle. The computer-implemented method also includes processing the color image through a first machine learning model for first object classification of one or more features corresponding to the vehicle. The first object classification is carried out without inputting any of: image data from the monochrome image; and other data derived from the monochrome image. The computer-implemented method also includes determining an accuracy confidence of the first object classification with respect to at least one of the one or more features. When the determined accuracy confidence is less than a predefined threshold, a combination of images is processed, which is a combination of the color image along with the monochrome image, or along with a depth image derived at least in part from the monochrome image. The combination of images is processed through a second machine learning model for second object classification of the at least one of the one or more features. The processing through the second machine learning model is more computationally expensive than the processing through the first machine learning model.

In accordance with another example embodiment, there is provided a vehicle identification system that includes at least one camera configured to capture both a color image and a monochrome image, each in respect of at least a portion of a vehicle. The vehicle identification system also includes at least one processor in communication with the at least one camera. At least one electronic storage medium stores program instructions that when executed by the at least one processor cause the at least one processor to perform establishing a first machine learning model to process the color image for first object classification of one or more features corresponding to the vehicle. The first object classification is carried out without inputting any of: image data from the monochrome image; and other data derived from the monochrome image. The program instructions when executed by the at least one processor also cause the at least one processor to perform determining an accuracy confidence of the first object classification with respect to at least one of the one or more features. The program instructions when executed by the at least one processor also cause the at least one processor to perform establishing a second machine learning model which, when the determined accuracy confidence is less than a predefined threshold, processes a combination of the color image along with the monochrome image, or along with a depth image derived at least in part from the monochrome image, for second object classification of the at least one of the one or more features. The processing through the second machine learning model is more computationally expensive than the processing through the first machine learning model.

Each of the above-mentioned embodiments will be discussed in more detail below, starting with example system and device architectures of the system in which the embodiments may be practiced, followed by an illustration of processing blocks for achieving an improved technical method, device, and system for vehicle identification.

Example embodiments are herein described with reference to flowchart illustrations and/or block diagrams of methods, apparatus (systems) and computer program products according to example embodiments. It will be understood that at least some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, which is a block diagram of a system 10 in accordance with example embodiments. The illustrated system 10 includes a plurality of cameras $20_1$-$20_n$ (hereinafter "the camera 20" will be understood to mean one of the cameras $20_1$-$20_n$). Also, it will be understood that "n" (number of cameras) can be any suitable integer greater than zero (including one).

The illustrated cameras $20_1$-$20_n$ are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the cameras $20_1$-$20_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the cameras $20_1$-$20_n$ and the other illustrated network devices are within the same Local Area Network (LAN). Alternatively, in another at least one example embodiment, a part of the illustrated system 10 is in one geographic location, and other part(s) of the illustrated system 10 are distantly spaced apart in other geographic location(s).

Still with reference to FIG. 1, the cameras $20_1$-$20_n$ communicate data and information to and from other network devices via the network 30. Two examples of such data and information, amongst other examples, are shown for convenience of illustration. For instance, the cameras $20_1$-$20_n$ transmit video data to one or more other network devices via the network 30. As another example, the cameras $20_1$-$20_n$ receive control data from other network devices via the network 30.

In some example embodiments, the cameras $20_1$-$20_n$ are fixed-mounted types of video cameras such as, for instance, License Plate Recognition (LPR) cameras, Pan-Tilt-Zoom (PTZ) cameras, box cameras, bullet cameras, etc. In other example embodiments, the cameras $20_1$-$20_n$ are some other type of camera such as, for instance, police vehicle cameras, dash cameras, etc. Also, it will be understood that the cameras $20_1$-$20_n$ need not all be of homogeneous type, and any suitable combination of cameras of different types (i.e. a heterogeneous combination of cameras) is also contemplated. In some examples, one or more of the cameras $20_1$-$20_n$ are rechargeable battery-powered cameras with respective target power consumption levels.

Figure 2:
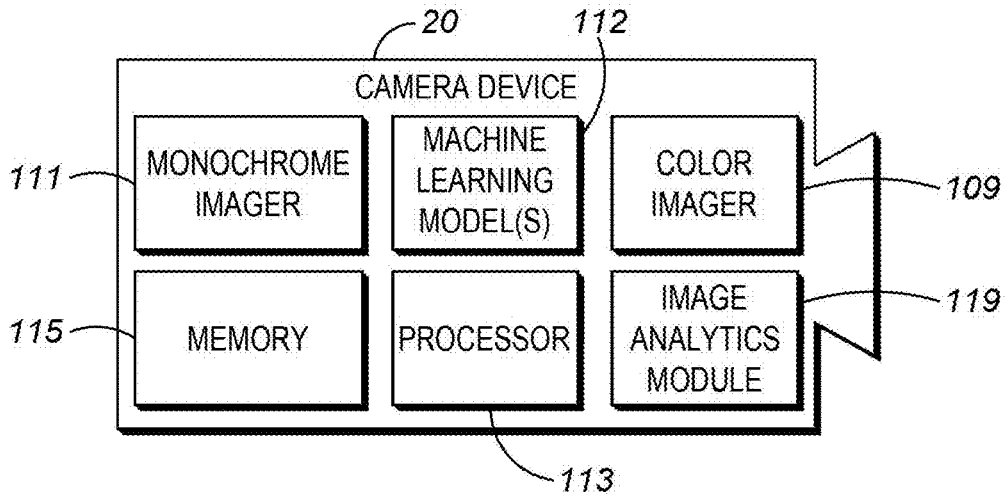
FIG. 2 is a block diagram illustrating additional details of a camera included within the system of FIG. 1.

Reference is now made to FIG. 2, which is a block diagram illustrating additional details of the camera 20 included within the system of FIG. 1.

The camera 20 includes a color imager 109 and a monochrome imager 111. Also, in respect of at least one example of the monochrome imager 111, the camera 20 may provide infrared bandpass and controlled illumination.

As will be appreciated by those skilled in the art, a color image provided from the color imager 109 can be combined with a monochrome image provided from monochrome imager 111 to produce a depth image. In the context of vehicle identification from images, a depth image can provide information not provided from just a two-dimensional color image. For example, determining color may be challenging when occlusion occurs due to crowding of vehicles within the Field of View (FOV) of the camera 20. Depth Information may permit segmenting of difficult-to-segment vehicles (since processing of the depth information may reveal parts of an image at a particular depth-of-interest) which may result in a more accurate color determination for a vehicle-of-interest by facilitating vehicle segmentation that might not be possible from a two-dimensional color image by itself.

As another example, in the case where an algorithm employed to locate license plates uses reflectors on the vehicle for more accurately locating plates, occlusion of one or more reflectors may impact the ability to plate find. (A similar scenario may occur when one or more of the reflectors are damaged or missing.) Depth information can create an outline of a vehicle-of-interest which may be used to potentially improve plate detection.

As yet another example, say that a bike rack, for instance, or some other similar license plate-occluding object, is blocking some (less than all) of the letters on a license plate. In such circumstance, the presence of the bike rack in the captured image may confuse two-dimensional optical character recognition algorithms. With three-dimensional depth, it may be possible to more clearly see which characters in an occluded license plate are impacted by the bike rack, and conversely which characters in an occluded license plate are not impacted by the bike rack.

As yet another example, depth information may facilitate distinguishing similar looking vehicles, e.g. "doppelgänger" vehicles, especially where the vehicles look very similar in the absence of vehicle measurement/size information. Creating a three-dimensional model of a vehicle to enhance geometric information may be beneficial in such cases.

Still with reference to FIG. 2, the camera 20 also includes one or more processors 113, one or more image analytics modules 119, and one or more memory devices 115 coupled to the processors and one or more network interfaces. Regarding the image analytics module 119, this generates metadata outputted to a server 40. The metadata can include, for example, records which describe various detections of objects such as, for instance, pixel locations for the detected object in respect of a first record and a last record for the camera within which the respective metadata is being generated. As will be appreciated by those skilled in the art, the functionality of the image analytics module 119 may be distributed throughout the system 10. For instance, part of this functionality may be provided by the image analytics module 119, and another part of this functionality may be provided by image analytics module 91 within the server 40.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 20, including the processor 113, may be combined together on one semiconductor chip. For example, the processor 113, the memory device 115 and the network interface of the camera 20 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

With reference again to FIG. 1, one or more of the cameras $20_1$-$20_n$ are configured to capture images of at least portions of vehicles (including their respective vehicle license plates). In some examples, the portions of the vehicles shown within the images may be all or most of corresponding observable portions of the vehicle (i.e. observable from where the camera 20 is positioned). In other alternative examples, the portions of the vehicles shown within the images may be only a license plate region (and the license plate displaying a license plate number). In some instances, a license plate may be entirely visible within an arbitrary-captured color image. In some instances, a license plate may, in a different arbitrary-captured color image, appear as a partly occluded object.

In some examples of vehicle images including those described above, respective feature vectors may be generated either within the camera device or within another device forming part of the system 10. The application of feature vectors in the area of license plate recognition is similar to its application in other areas of analytics technology such as, for example, facial recognition technology. Also, in some examples the feature vector is an image signature that may be generated: over and around the license plate region in a captured image; over and around a vehicle of interest within a captured image, etc.

Two or more feature vectors can be compared. More specifically, a feature vector generated from a new or unknown vehicle image can be compared against one or more known feature vectors of respective one or more known images (also herein referred to as "reference" images) that depict a unique vehicle or portion thereof (an example in respect of the latter includes a vehicle's front vehicle plate or a vehicle's rear vehicle plate, and excluding or including other parts of the vehicle to which the vehicle plate is attached). This is carried out in order to verify if the new or unknown image matches the one or more reference images. Also, it will be understood that, over time, there may be a plurality of different feature vectors generated in respect of a unique vehicle and/or respective sub-objects of the vehicle (for example, based on these being generated from different captured images coming from different environments); however, if two feature vectors are sufficiently similar, a calculated determination can be made that these feature vectors are derived from the same vehicle or sub-object of the vehicle.

In accordance with some examples, all vehicle images collected by the system 10 can be organized into unique groups, where each group corresponds to images depicting a same vehicle and/or respective sub-objects (in some examples, each of the front vehicle plate and the rear vehicle plate may be considered to be a separate unique plate even though they are both attached to the same vehicle). By associating all feature vectors with respective groups, clustering of same or very similar feature vectors may be achieved. When a feature vector corresponding to a new or unknown vehicle is generated, a particular cluster of the feature vectors may be selected for the purposes of feature vector comparison.

Still with reference to FIG. 1, shown therein is a server 40 which is coupled to the network 30 to receive data and information from other devices on the network 30 such as, for example, any of the cameras $20_1$-$20_n$. The server 40 is also coupled to any suitable number of client devices 70 via a network 60 in order that the server 40 may, for example, send and receive data and information between the client devices 70 and the server 40. In some examples, all or parts of the server 40 may be implemented as cloud computing.

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of the client devices 70 and other network devices can be any number of known arrangements for accessing a data communications network, such as, for example, dial-up SLIP/PPP, ISDN, dedicated lease line service, broadband (e.g. cable) access, DSL, ATM, Frame Relay, or other known access techniques (for example, RF links). Although in the illustrated example embodiment the network 30 and the network 60 are shown as separate, in some examples there may be some overlap and commonality between the network 30 and the network 60. In at least one example, the network 60 and the network 30 may be the same network.

Still with reference to FIG. 1, the illustrated server 40 includes one or more processors 86 and an LPR module 80. The LPR module 80 enables various LPR-related functions including, for example, license plate localization, license plate sizing and orientation (adjusting), normalization, character segmentation, Optical Character Recognition (OCR) and syntactical/geometrical analysis. The server 40 also includes a database 81 maintained within storage 83. Amongst other things, the database 81 is organized storage for license plate information which may include, for example, license number, make/model, state, color, etc. Also, in at least one example, the storage 83 may be configured to store images of vehicles and respective metadata in relation to those images.

The server 40 also includes a query manager module 85 (provides any of the client devices 70 an interface for retrieving information from the database 81), one or more machine learning models 87 (explained below), and the image analytics module 91 (explained later herein). The server 40 also optionally includes a Video Management System (VMS) module 89. As will be understood by those skilled in the art, a VMS as herein contemplated is software configured to provide an interface to live and recorded images in respect of the system 10. A VMS may also facilitate other functions within the system 10 including, for example, the creation and management of analytic rules that define when and under what circumstances alerts are generated within the system 10.

The illustrated server 40 also includes other software components 93. These other software components will vary depending on the requirements of the server 40 within the overall system. As just one example, the other software components 93 might include special test and debugging software, or software to facilitate version updating of modules within the server 40.

Regarding the one or more machine learning models 87, these may include one or more Convolutional Neural Networks (CNNs) to provide for deep learning (through many images to realize a model of building a binary vector for every input image). The metric of this model is to permit verification as to whether two or more feature vectors are from a same vehicle with potentially high accuracy (similar to the use of CNNs in connection with face recognition technology). Counter-intuitively the feature vector may be better than even having a "plate number" (i.e. read by OCR), as in some situations one may not be able to read a correct plate number, but a generated feature vector can continue to be linked to a correct vehicle.

Figure 3:
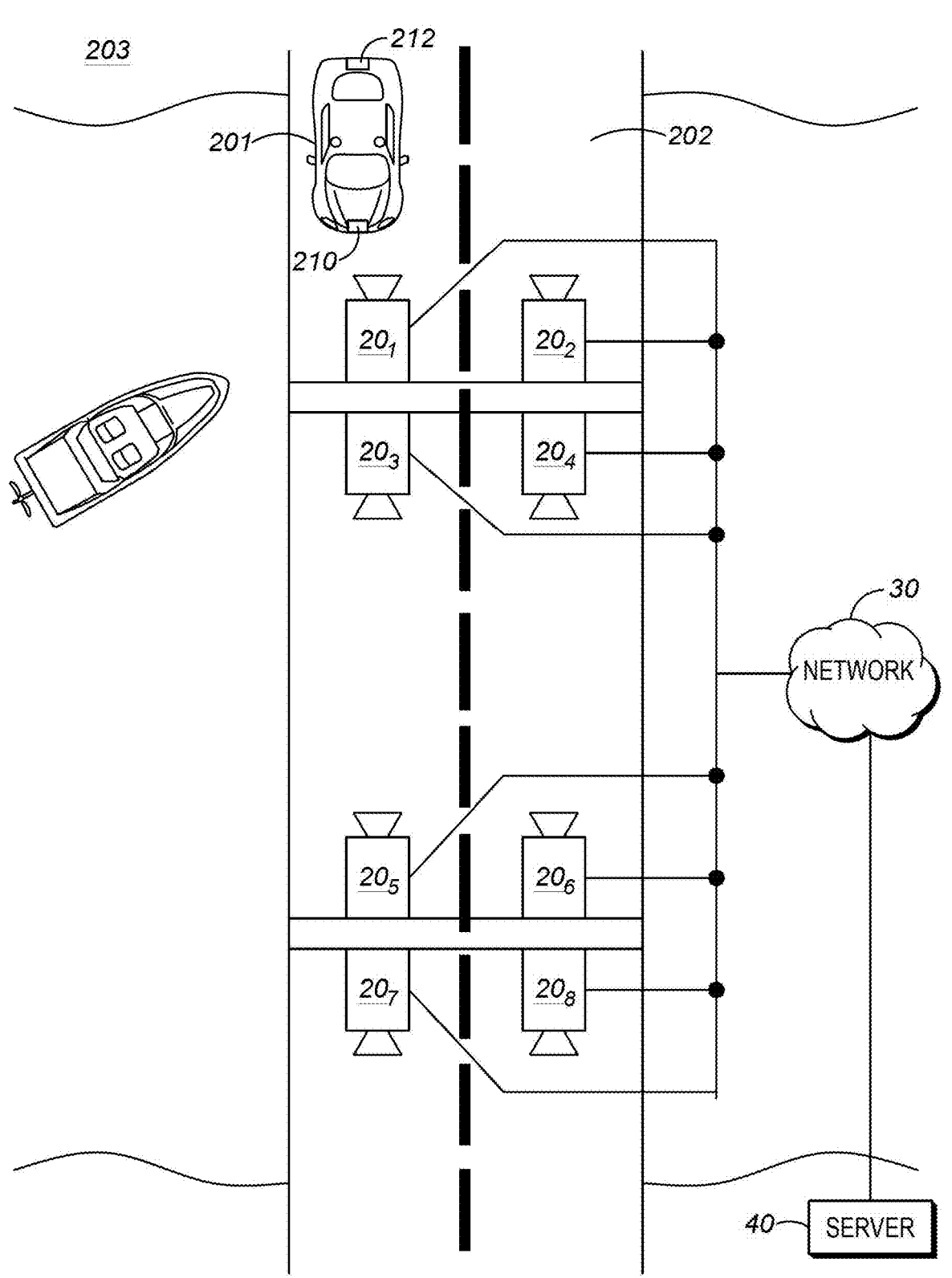
FIG. 3 is a schematic diagram of a practical implementation, in accordance with example embodiments, of the system of FIG. 1.

Reference is now made to FIG. 3. FIG. 3 is a schematic diagram of a practical implementation, in accordance with example embodiments, of the system of FIG. 1. In the illustrated example implementation, vehicle 201 is driving along road 202 in a geographic region 203 within which the system 10 is present. As the vehicle 201 continues to drive along the road 202, a front license plate 210 of the vehicle 201 passes within an FOV of LPR cameras (such as, for example, camera $20_1$ and camera $20_5$). Also, a rear license plate 212 of the vehicle 201 passes within a Field of View (FOV) of LPR cameras (such as, for example, camera $20_3$ and camera $20_7$). During this time period, front and rear license plate images can be captured by a number of the cameras $20_1$-$20_8$, and these images are processed within the LPR module 80 (shown in FIG. 1 within the server 40; however this module need not be entirely within the server 40, and may alternatively be partly or entirely within another device such as, for example, some or all of the cameras $20_1$-$20_8$).

Still with reference to the example embodiment of FIG. 3, the LPR module 80 can operate cooperatively with the image analytics module 91 and the machine learning model(s) 87 to identify: the license plate number (and thereby identify the registered owner) of the vehicle 201; and other types of features corresponding to the vehicle 201 in support of object classification.

As shown, the cameras $20_1$-$20_8$ are communicatively coupled to the network 30 which is in turn communicatively coupled to the server 40. The network 30 and the server 40 have been previously herein described in relation to FIG. 1.

Figure 5:
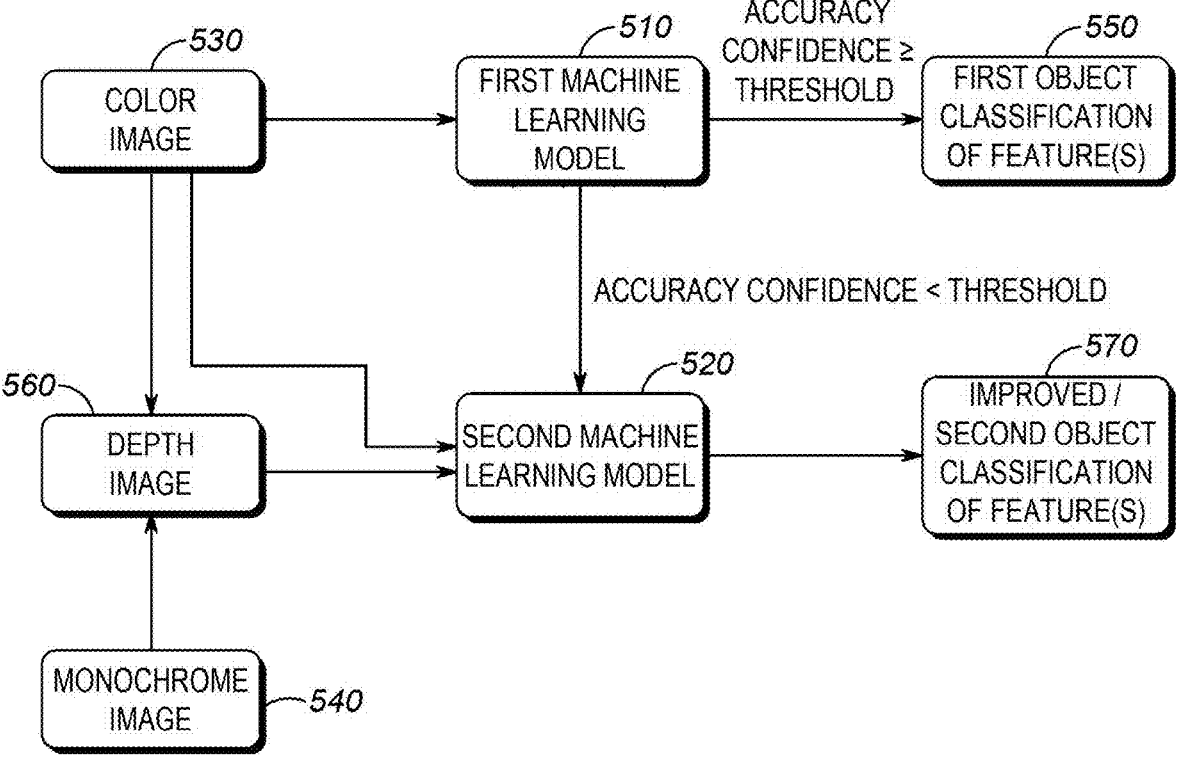
FIG. 5 is a block diagram illustrating, in accordance with an example embodiment, inputs and outputs to two machine learning models.

Reference is now made to FIGS. 4 and 5. FIG. 4 is a flow chart illustrating a method 400 for multi-model classification in a vehicle identification system, in accordance with an example embodiment. FIG. 5 is a block diagram illustrating, in accordance with an example embodiment, inputs and outputs to two machine learning models (first machine learning model 510 and second machine learning model 520). In at least one example, the first machine learning model 510 and the second machine learning model 520 are both implemented on an at least one processor contained within the camera 20 (for instance, the processor 113 shown in FIG. 2 implements two machine learning models 112). In at least one alternative example, the first machine learning model 510 is implemented on an at least one processor contained within the camera 20 (for instance, the processor 113 shown in FIG. 2 implements one machine learning model 112) and the second machine learning model 520 is implemented on an at least one processor contained within the server 40 (for instance, the one or more processors 86 shown in FIG. 1 implements a different machine learning model 87). In yet another at least one alternative example, the first machine learning model 510 and the second machine learning model 520 are both implemented on an at least one processor contained within the server 40 (for instance, the one or more processors 86 shown in FIG. 1 implements two machine learning models 87).

In at least one example, the second machine learning model 520 is employed without reusing prior obtained information from the first machine learning model 510 (an impact of which may be permitting independent training of the two models). In at least one alternative example, the second machine learning model 520 reuses embedding vectors returned by first machine learning model 510 so that the entire color image is not needed when the second machine learning model 520 is employed.

Continuing on with reference once again to FIG. 4, initially at action 410 both a color image (block 530 in FIG. 5) and a monochrome image (block 540 in FIG. 5) are captured, each in respect of at least a portion of a vehicle. For example, the color imager 109 and the monochrome imager 111 of the camera 20 capture the color image 530 and the monochrome image 540 respectively, or alternatively a color imager in one of the cameras $20_1$-$20_n$ captures the color image 530 and a monochrome imager in a different one of the cameras $20_1$-$20_n$ captures the monochrome image 540. In some examples, the capturing of both the color image 530 and the monochrome image 540 may be synchronized capturing (in other words, it will be understood that stereoscopic algorithms are contemplated for such examples). In some examples, an additional pattern mask is contemplated to facilitate active stereo which may increase depth accuracy.

Next in the method 400, the color image is processed (420) through a first machine learning model for first object classification of one or more features corresponding to the vehicle (block 550 in FIG. 5). The first object classification is carried out without inputting any of: i) image data from the monochrome image; and ii) other data derived from the monochrome image.

Example of the above-mentioned one or more features corresponding to the vehicle include the following: a license plate number for the vehicle; a color for the vehicle; and a make and model for the vehicle. Some of these features such as, for example, make and model may be more difficult to determine from an image captured by the color imager 109.

Next in the method 400, an accuracy confidence of the first object classification is determined (430) with respect to at least one of the one or more features. It will be understood that accuracy confidence may vary depending on the conditions that existed at the time that the camera 20 captured images. Examples of conditions adverse to high accuracy confidence include existence of a shadow, low light conditions, and too many vehicles crowded within the FOV of the camera 20 (as already discussed, adding depth image data may, in the case of an adverse condition like vehicle crowding, buttress a confidence-reducing deficiency present in the corresponding two-dimensional color image).

Next in the method 400 is decision action 440. In particular, if the determined accuracy confidence (i.e. from the action 430) is less than a predefined threshold, then action 450 follows, and a combination of the color image along with the monochrome image, or along with a depth image (block 560 in FIG. 5) derived at least in part from the monochrome image, is processed through a second machine learning model for second object classification of the at least one of the one or more features (block 570 in FIG. 5). Also, in some examples (and consistent with arrows shown in FIG. 5), the depth image may be generated by combining the color image with the monochrome image. In at least one alternative example (differing from what is illustrated in FIG. 5) the color image 530 may be concatenated with the monochrome image 540 as input to the second machine learning model 520.

The processing through the second machine learning model is more computationally expensive than the processing through the first machine learning model. In one example, processing image data for a particular vehicle through the second machine learning model may result in between one and a half to two and a half as many computations as compared to processing that image data through the first machine learning model.

On the other hand, if the determined accuracy confidence (i.e. from the action 430) is not less than a predefined threshold, then the action 450 does not occur and the method 400 ends.

In at least one example, a second operand obtained from the second object classification of the at least one of the one or more features may be compared with a first stored operand that was obtained from the first object classification of the at least one of the one or more features, and then the first stored operand may be overwritten with the second operand in a storage when the second operand does not match the first stored operand.

Reference is now made to FIG. 6. FIG. 6 is a table of experimental data for different thresholds of accuracy confidence for the first machine learning model 510 of the two machine learning models shown in FIG. 5. In connection with generating the experimental data shown in the table of FIG. 6, the total number of images employed is 6259 (i.e. 6259 is the total for this example dataset). Also, 1422 classes are used in the example dataset.

Each of the recall numbers in the table of FIG. 6 is computed based on an average recall over the 1422 classes. In other words, the recall for any given row in the table equals $(recall_1+recall_2+recall_3+ \ldots +recall_{1422})/1422$. Each of the 1422 recalls summated in the numerator of this equation is number of correct images for a particular class divided by total number of images for that particular class.

"#CORRECT IMAGE" in each row of the table is the overall total number of correct images associated with the "THRESHOLD" for that particular row ("correct" meaning that the threshold condition is not met). As an example in this regard, it will be seen that the number of correct images at threshold 1.00 is only five images (understandable because there are very few images with 100% confidence).

Regarding "PRECISION", this is calculated using a similar summation formula as for "RECALL"; however it is measuring the ratio of precise classifications to total classifications.

From the table of FIG. 6 it will be seen that if "THRESHOLD" is set too high, the number of images needing to be rerun (i.e. causing the second learning machine 520 to be employed) will be very large. By contrast, if "THRESHOLD" is too low, the precision will not be good enough. A balance between precision and hardware resources can be achieved by choosing a threshold of accuracy confidence that is in-between the two extremes such as, for example, 0.70. When the threshold is 0.70 then, for this particular example, the amount of images that needs to be rerun is about 20% (i.e. since "RECALL" for that row of the table is 0.7993).

It will be understood that the data shown in the table of FIG. 6 (and the associated description of this figure) is simply for the purposes of facilitating an understanding of example embodiments and does not in any way limit the scope of the claims of this application. For example, it is contemplated that a threshold of accuracy confidence suitably higher or suitably lower than 0.70 may, in some examples, be appropriate.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot store digital images of a vehicle or a portion thereof, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for multi-model classification in a vehicle identification system, the computer-implemented method comprising:

providing both a color image and a monochrome image, each in respect of at least a portion of a vehicle;

processing the color image through a first machine learning model for first object classification of one or more features corresponding to the vehicle, wherein the first object classification is carried out without inputting any of:

image data from the monochrome image; and other data derived from the monochrome image;

determining an accuracy confidence of the first object classification with respect to at least one of the one or more features; and when the determined accuracy confidence is less than a predefined threshold, processing a combination of the color image along with the monochrome image, or along with a depth image derived at least in part from the monochrome image, through a second machine learning model for second object classification of the at least one of the one or more features,

14 wherein:

the processing through the second machine learning model is more computationally expensive than the processing through the first machine learning model, the first and second machine learning models are implemented on at least one processor contained within a rechargeable battery-powered camera, and the predefined threshold is set based on a target power consumption level for the rechargeable battery-powered camera.

2. The computer-implemented method of claim 1 wherein the combination of the color image along with one of: the monochrome image; and the depth image derived at least in part from the monochrome image is a combination of the color image and the monochrome image.

3. The computer-implemented method of claim 1 wherein the combination of the color image along with one of: the monochrome image; and the depth image derived at least in part from the monochrome image is a combination of the color image and the depth image.

4. The computer-implemented method of claim 3 wherein both the color image and the monochrome image are synchronously captured images, and the depth image is generated by combining the color image with the monochrome image.

5. The computer-implemented method of claim 1 further comprising:

comparing a second operand obtained from the second object classification of the at least one of the one or more features with a first stored operand that was obtained from the first object classification of the at least one of the one or more features; and overwriting the first stored operand with the second operand in a storage when the second operand does not match the first stored operand.

6. The computer-implemented method of claim 1 wherein the at least one of the one or more features corresponds to a license plate number for the vehicle.

7. The computer-implemented method of claim 1 wherein the at least one of the one or more features corresponds to a color for the vehicle.

8. The computer-implemented method of claim 1 wherein:

the at least a portion of a vehicle is a license plate displaying a license plate number, and the license plate appears as a partly occluded object in the color image.

9. The computer-implemented method of claim 1 wherein the at least one of the one or more features corresponds to a make and model for the vehicle.

10. A vehicle identification system comprising:

at least one camera configured to capture both a color image and a monochrome image, each in respect of at least a portion of a vehicle;

at least one processor configured to communicate with components of the at least one camera; and at least one electronic storage medium storing program instructions that when executed by the at least one processor cause the at least one processor to perform:

establishing a first machine learning model to process the color image for first object classification of one or more features corresponding to the vehicle, wherein the first object classification is carried out without inputting any of:

image data from the monochrome image; and other data derived from the monochrome image;

determining an accuracy confidence of the first object classification with respect to at least one of the one or more features; and establishing a second machine learning model which, when the determined accuracy confidence is less than a predefined threshold, processes a combination of the color image along with the monochrome image, or along with a depth image derived at least in part from the monochrome image, for second object classification of the at least one of the one or more features, wherein:

the processing through the second machine learning model is more computationally expensive than the processing through the first machine learning model, the at least one processor is contained within the at least one camera, and the at least one camera is a rechargeable battery-powered camera, and the predefined threshold is set based on a target power consumption level for the rechargeable battery-powered camera.

11. The vehicle identification system of claim 10 wherein the combination of the color image along with one of: the monochrome image; and the depth image derived at least in part from the monochrome image is a combination of the color image and the monochrome image.

12. The vehicle identification system of claim 10 wherein the combination of the color image along with one of: the monochrome image; and the depth image derived at least in part from the monochrome image is a combination of the color image and the depth image.

13. The vehicle identification system of claim 12 wherein capturing of both the color image and the monochrome image by the at least one camera is synchronized capturing, and the depth image is generated by combining the color image with the monochrome image.

14. The vehicle identification system of claim 10 wherein the at least one of the one or more features corresponds to a license plate number for the vehicle.

15. The vehicle identification system of claim 10 wherein the at least one of the one or more features corresponds to a color for the vehicle.

16. The vehicle identification system of claim 10 wherein the at least one of the one or more features corresponds to a make and model for the vehicle.

\* \* \* \* \*